(12) United States Patent
Kumaki et al.

(10) Patent No.: US 10,563,109 B2
(45) Date of Patent: Feb. 18, 2020

(54) ADDITIVE FOR SLURRY, DRILLING MUD, AND CEMENT SLURRY

(71) Applicant: KURARAY CO., LTD., Kurashiki-shi (JP)

(72) Inventors: Yosuke Kumaki, Kurashiki (JP); Yasutomo Saito, Kurashiki (JP)

(73) Assignee: KURARAY CO., LTD., Kurashiki-shi (JP)

(*) Notice: Subject to any disclaimer, the term of this patent is extended or adjusted under 35 U.S.C. 154(b) by 456 days.

(21) Appl. No.: 15/300,649

(22) PCT Filed: Mar. 23, 2015

(86) PCT No.: PCT/JP2015/058799
§ 371 (c)(1),
(2) Date: Sep. 29, 2016

(87) PCT Pub. No.: WO2015/151910
PCT Pub. Date: Oct. 8, 2015

(65) Prior Publication Data
US 2017/0174971 A1  Jun. 22, 2017

(30) Foreign Application Priority Data
Mar. 31, 2014 (JP) ................. 2014-074291

(51) Int. Cl.
| C09K 8/035 | (2006.01) |
| C08F 216/06 | (2006.01) |
| C04B 40/00 | (2006.01) |
| C04B 16/04 | (2006.01) |
| C09K 8/467 | (2006.01) |
| C04B 111/70 | (2006.01) |
| C04B 103/00 | (2006.01) |
| C04B 103/46 | (2006.01) |

(52) U.S. Cl.
CPC ............. *C09K 8/035* (2013.01); *C04B 16/04* (2013.01); *C04B 40/0042* (2013.01); *C08F 216/06* (2013.01); *C09K 8/467* (2013.01); *C04B 2103/0057* (2013.01); *C04B 2103/46* (2013.01); *C04B 2111/70* (2013.01); *C04B 2201/10* (2013.01)

(58) Field of Classification Search
CPC ..... C04B 24/02; C04B 24/2623; C04B 28/02; C04B 40/0042; C04B 16/04; C04B 2103/0057; C04B 2103/46; C04B 2111/70; C04B 2201/10; C08F 216/06; C09K 8/035; C09K 8/467; C09K 8/487; C09K 8/5083
See application file for complete search history.

(56) References Cited

U.S. PATENT DOCUMENTS

| 4,569,395 A | 2/1986 | Carpenter |
| 4,967,839 A | 11/1990 | Carpenter et al. |
| 5,061,387 A | 10/1991 | Victorius |
| 6,656,266 B1 | 12/2003 | Barlet-Gouedard et al. |
| 6,739,806 B1 | 5/2004 | Szymanski et al. |
| 7,731,793 B2 | 6/2010 | Beckman |
| 2007/0284104 A1* | 12/2007 | Beckman ............ C04B 24/2623 166/293 |
| 2007/0284105 A1* | 12/2007 | Beckman ............ C04B 24/2623 166/293 |
| 2008/0227667 A1 | 9/2008 | Szymanski et al. |
| 2008/0293884 A1* | 11/2008 | Tanimoto ................. C08J 3/122 524/852 |
| 2013/0197154 A1 | 8/2013 | Yamaguchi et al. |
| 2015/0258733 A1* | 9/2015 | Okamoto ............... B33Y 10/00 428/413 |
| 2015/0322202 A1* | 11/2015 | Wang ..................... D01D 10/02 623/1.42 |
| 2019/0134200 A1* | 5/2019 | Lubda .................... A61K 9/145 |
| 2019/0153290 A1* | 5/2019 | Katou .................... C09K 8/426 |

FOREIGN PATENT DOCUMENTS

| CN | 1495205 A | 5/2004 |
| CN | 101466811 A | 6/2009 |
| CN | 101484547 A | 7/2009 |
| CN | 102822266 A | 12/2012 |
| CN | 103124748 A | 5/2013 |
| JP | 2004-344751 A | 12/2004 |
| JP | 2009-221461 A | 10/2009 |
| RU | 2 204 012 C2 | 5/2003 |
| RU | 2 266 312 C1 | 12/2005 |
| RU | 2 388 782 C2 | 5/2010 |
| SU | 717070 A1 | 2/1980 |
| WO | 2012/043280 A1 | 4/2012 |

OTHER PUBLICATIONS

International Search Report dated Jun. 23, 2015, in PCT/JP15/58799 filed Mar. 23, 2015.
J. Plank, et al., "Comparative Study of the Working Mechanisms of Chemically Different Cement Fluid Loss Polymers,", Society of Petroleum Engineers Conference Paper ID 121542, 2009, 26 pages.
Office Action dated Nov. 16, 2018 in Russian Patent Application No. 2016142352, 13 pages (with English translation).

\* cited by examiner

*Primary Examiner* — Jenny R Wu
(74) *Attorney, Agent, or Firm* — Oblon, McClelland, Maier & Neustadt, L.L.P.

(57) ABSTRACT

Provided by the present invention is an additive for a slurry being capable of inhibiting viscosity elevation and dehydration at high temperatures at low cost, through use for a slurry for civil engineering and construction (for example, a drilling mud and a drilling cement slurry for use in well drilling. etc.), and the like. A powdery additive for a slurry, the powdery additive containing a vinyl alcohol polymer, which has: a solubility of 25% or less when immersed in hot water at 60° C. for 3 hours; a degree of saponification of at least 99.5 mol %; an average degree of polymerization of at least 1,500 and 4,500 or less; and the amount of 1,2-glycol linkage of 1.8 mol % or less, the powdery additive being capable of passing through a sieve having a nominal mesh opening size of 1.00 mm.

10 Claims, No Drawings

ADDITIVE FOR SLURRY, DRILLING MUD, AND CEMENT SLURRY

TECHNICAL FIELD

The present invention relates to an additive for a slurry, a drilling mud and a cement slurry, and a production method of a drilling mud and a production method of a cement slurry.

BACKGROUND ART

In wells and the like for collecting buried resources such as petroleum and natural gases, a slurry for civil engineering and construction typified by a drilling mud and a drilling cement slurry has been conventionally used.

The drilling mud plays roles in, for example: transporting drilled clasts, drilling wastes and the like; improving lubricating properties of bits and drill pipes; filling in holes on the porous ground; balancing out the reservoir pressure that results from the hydrostatic pressure (pressure from the rock stratum); and the like. In general, the drilling mud contains water and bentonite as principal components to which barites, salts, clays and the like are further added, whereby intended performances can be achieved. Such a drilling mud is demanded to have appropriate flow characteristics such as having temperature stability, not being significantly affected by variation of concentrations of electrolytes (for example, carboxylic acid salts) in the ground, and the like. To meet such demands, adjusting the viscosity of the drilling mud, and inhibiting dissipation of the moisture contained in the drilling mud (hereinafter, may be also referred to as "dehydration") may be required. For adjusting the viscosity of the drilling mud and for inhibiting the dehydration, a method which includes adding a polymer, for example, starch, a starch ether (carboxymethyl starch, etc.), carboxymethyl cellulose, carboxymethyl hydroxyethyl cellulose or the like is usually adopted.

However, the addition of such polymers may extremely elevate the viscosity of the drilling mud, whereby injection of the drilling mud by a pump may be difficult. Moreover, there may exist disadvantages that dehydration of starches and derivatives thereof may not be sufficiently inhibited within a temperature range exceeding about 120° C., and the dehydration may not be sufficiently inhibited by carboxymethyl cellulose and carboxymethyl hydroxyethyl cellulose within a temperature range of 140° C. to 150° C.

On the other hand, the drilling cement slurry is used for, e.g., fixing the casing pipe in the well and protecting the inside wall of the well through cementing which comprises injecting the drilling cement slurry into tubular void portions between the stratum and a casing pipe installed in the well, followed by hardening therein. In general, the injection of the drilling cement slurry into tubular void portions is carried out by using a pump. Thus, the drilling cement slurry is required to have extremely low viscosity and not to be accompanied by segregation such that the injection thereof by using the pump can be readily carried out.

However, in cementing a well, a defect is likely to occur in a cemented part due to: material segregation; dissipation of the moisture to cracks in the well; and the like. Accordingly, a dehydration-reducing agent such as walnut shells, cotton seeds, clay minerals, polymer compounds and the like has been employed to be added to the drilling cement slurry, and in particular, vinyl alcohol polymers being a polymer compound are a well-known dehydration-reducing agent.

In regard to the vinyl alcohol polymer as a dehydration-reducing agent, for example, Patent Document 1 discloses a method in which a vinyl alcohol polymer having a degree of saponification of at least 95 mol % is used; Patent Document 2 discloses a method in which a vinyl alcohol polymer having a degree of saponification of 92 mol % or less is used; and Patent Document 3 discloses a method in which a vinyl alcohol polymer having a degree of saponification of at least 99 mol % is used. However, according to these methods, performances of the dehydration-reducing agent at high temperatures in particular, may be insufficient, or feeding of the drilling cement slurry by the pump may be difficult through elevating the viscosity.

In order to moderate the viscosity elevation of the drilling cement slurry and/or to improve deteriorated performances of the dehydration-reducing agent at high temperatures: Patent Document 4 discloses a method in which a vinyl alcohol polymer crosslinked by melamine-formaldehyde is used; Patent Document 5 discloses a method in which a vinyl alcohol polymer produced by crosslinking of hydroxyl groups of a vinyl alcohol polymer by an acetalization reaction or the like is used; and Patent Document 6 discloses a method in which a vinyl alcohol polymer produced by pH-sensitive crosslinking using a boron ion, etc., is used. Although a given effect of improving the performances of the dehydration-reducing agent at high temperatures is achieved according to these methods, it is necessary to carry out the reaction with the crosslinking agent after a water soluble vinyl alcohol polymer is produced beforehand, and thus the cost is likely to be increased.

PRIOR ART DOCUMENTS

Patent Documents

Patent Document 1: U.S. Pat. No. 4,569,395
Patent Document 2: U.S. Pat. No. 4,967,839
Patent Document 3: U.S. Pat. No. 7,731,793
Patent Document 4: U.S. Pat. No. 5,061,387
Patent Document 5: U.S. Pat. No. 6,656,266
Patent Document 6: U.S. Pat. No. 6,739,806

Nonpatent Documents

Nonpatent Document 1: Society of Petroleum Engineers Conference Paper ID 121542

SUMMARY OF THE INVENTION

Problems to be Solved by the Invention

An objective of the present invention is to provide an additive for a slurry being capable of inhibiting in a slurry such as a slurry for civil engineering and construction (for example, a drilling mud and a drilling cement slurry for use in well drilling and the like), dehydration from the slurry and viscosity elevation of the slurry at high temperatures at low cost. Furthermore, another objective of the present invention is to provide a drilling mud and a drilling cement slurry containing the additive for a slurry, and a production method of the drilling mud and a production method of the drilling cement slurry.

Means for Solving the Problems

The present inventors thoroughly studied in order to achieve the objectives described above, and consequently found that when a vinyl alcohol polymer having: a solubility of 25% or less when immersed in hot water at 60° C. for 3 hrs; a degree of saponification of at least 99.5 mol %; an average degree of polymerization of at least 1,500 and 4,500 or less; and an amount of 1,2-glycol linkage of 1.8 mol % or less is used, and a powdery form being capable of passing through a sieve having a nominal mesh opening size of 1.00 mm is adopted, a slurry can be readily obtained in which viscosity elevation and dehydration at high temperatures are inhibited. Thus, as a result of further investigations based on these findings, the present invention was accomplished.

More specifically, an aspect of the present invention is directed to a powdery additive for a slurry, the powdery additive containing a vinyl alcohol polymer, in which the vinyl alcohol polymer has: a solubility of 25% or less when immersed in hot water at 60° C. for 3 hrs; a degree of saponification of at least 99.5 mol %; an average degree of polymerization of at least 1,500 and 4,500 or less; and an amount of 1,2-glycol linkage of 1.8 mol % or less, and the powdery additive is capable of passing through a sieve having a nominal mesh opening size of 1.00 mm.

The proportion of ethylene unit with respect to the total structural units in the vinyl alcohol polymer is preferably less than 10 mol %.

The additive for a slurry can be preferably used as an additive for a slurry used in civil engineering and construction. The additive for a slurry used in civil engineering and construction can be more preferably used as an additive for a drilling mud (an additive for a drilling mud slurry), or an additive for a cement slurry.

When the additive for a slurry is the additive for a drilling mud, the additive is preferably capable of passing through a sieve having a nominal mesh opening size of 500 μm.

When the additive for a slurry is the additive for a cement slurry, the vinyl alcohol polymer is preferably capable of passing through a sieve having a nominal mesh opening size of 250 μm.

Still another aspects of the present invention include: a drilling mud containing the additive for a slurry as an additive for a drilling mud; and a production method of a drilling mud including the step of mixing the additive for a drilling mud, water, and a muddy material.

Yet another aspects of the present invention include: a cement slurry containing the additive for a slurry as an additive for a cement slurry; and a production method of a cement slurry including the step of mixing the additive for a cement slurry, a hardening powder, and a liquid.

As referred to hereinabove, the "nominal mesh opening size" means the nominal mesh opening size defined in JIS-Z8801: 2000 "Test sieves—Part 1: Test sieves of metal wire cloth". The same applies to the "nominal mesh opening size" described in the following.

Effects of the Invention

According to the aspects of the present invention, the additive for a slurry, the drilling mud and the drilling cement slurry being capable of inhibiting viscosity elevation and dehydration at high temperatures at low cost, in slurries such as a slurry for civil engineering and construction (for example, drilling muds and drilling cement slurries for use in well drilling and the like) are provided.

DESCRIPTION OF EMBODIMENTS

Embodiments of the present invention include: an additive for a slurry, a drilling mud and a production method thereof, and a cement slurry and a production method thereof. Hereinafter, the embodiments of the present invention will be described in detail.

Additive for Slurry

The additive for a slurry according to an embodiment of the present invention is to be added to a slurry for civil engineering and construction, etc., and is suitably added to a drilling mud and a cement slurry. Of course, the additive for a slurry may be used not only in the drilling mud and the cement slurry, but also in slurries for other intended usage which require inhibition of viscosity elevation and dehydration at high temperatures.

The additive for a slurry contains a vinyl alcohol polymer (hereinafter, may be also referred to as "PVA"), and has a powdery form being capable of passing through a sieve having a nominal mesh opening size of 1.00 mm. The PVA is contained in the additive for a slurry in a powdery form (hereinafter, such a powdery PVA may be also referred to as "PVA powder"). The additive for a slurry may contain only the PVA powder, or may contain optional component(s) in addition to the PVA powder. The lower limit of the percentage content of the PVA powder in the additive for a slurry is, for example, 50% by mass, and preferably 80% by mass. On the other hand, the upper limit of the percentage content of the PVA powder in the additive for a slurry is typically 100% by mass.

Particle Size

The PVA powder has a particle size that enables passage through a sieve having a nominal mesh opening size of 1.00 mm (16 mesh). When such a PVA powder is contained as an additive in a drilling mud, a drilling cement slurry or the like, inhibition of dehydration from the slurry at high temperatures is facilitated. On the other hand, the lower limit value of the particle size of the PVA powder falls within the range not leading to extremely great solubility, and the particle size typically does not enable passage through a sieve having a nominal mesh opening size of 45 μm (325 mesh), and the particle size preferably does not enable passage through a sieve having a nominal mesh opening size of 53 μm (280 mesh).

Solubility

The lower limit of the solubility of the PVA powder when immersed in hot water at 60° C. for 3 hrs is preferably 5%, more preferably 10%, and still more preferably 15%. On the other hand, the upper limit of the solubility is 25%, preferably 22%, and more preferably 18%. When the solubility of the PVA powder is greater than 25%, the dehydration from the slurry at high temperatures can not be sufficiently inhibited.

In this regard, the solubility of the PVA powder may be determined by: adding 4 g of the PVA powder in 100 g of water heated to 60° C.; stirring the mixture for 3 hrs with a magnetic stirrer; and calculating from the weight of the initially charged PVA powder (4 g), and the weight of undissolved PVA powder separated by using a wire mesh having a nominal mesh opening size of 75 μm (200 mesh) measured after drying with a heating dryer at 105° C. for 3 hrs.

Vinyl Alcohol Polymer (PVA)

PVA is synthesized by saponifying a vinyl ester polymer obtained by polymerizing a vinyl ester monomer. In other words, the PVA contained in the additive for a slurry can be easily synthesized by a well-known method so as to have intended characteristics, without purposely carrying out crosslinking and the like; therefore, the production cost of the additive for a slurry can be lowered.

As the polymerization procedure of the vinyl ester monomer, for example, bulk polymerization, solution polymerization, suspension polymerization, emulsion polymerization, dispersion polymerization and the like may be exemplified, and in light of an industrial viewpoint, the solution polymerization, the emulsion polymerization and the dispersion polymerization are preferred. The polymerization system of the vinyl ester monomer may be any of batch polymerization, semi-batch polymerization and continuous polymerization.

Examples of the vinyl ester monomer include vinyl acetate, vinyl formate, vinyl propionate, vinyl caprylate, vinyl versatate and the like, and of these, vinyl acetate is preferred in light of an industrial viewpoint.

PVA may be a product of saponification of a vinyl ester polymer obtained by copolymerizing ethylene. By copolymerizing a vinyl ester with ethylene, the solubility of the PVA after the saponification can be decreased. Accordingly, the viscosity elevation of the slurry and the dehydration at high temperatures can be more inhibited.

The PVA may also be a product of saponification of a vinyl ester polymer obtained by copolymerizing other monomer except for the vinyl ester monomer and ethylene, within the range not impairing principles of the present invention. Examples of the other monomer include: α-olefins such as propylene, n-butene and isobutylene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide; acrylamide derivatives such as N-methylacrylamide, N-ethylacrylamide, N,N-dimethylacrylamide, diacetoneacrylamide, acrylamidopropanesulfonic acid and salts thereof, acrylamidopropyldimethylamine and salts thereof or quaternary salts of the same, and N-methylolacrylamide and derivatives thereof; methacrylamide; methacrylamide derivatives such as N-methylmethacrylamide, N-ethylmethacrylamide, methacrylamidopropanesulfonic acid and salts thereof, methacrylamidopropyldimethylamine and salts thereof or quaternary salts of the same, and N-methylolmethacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate and allyl chloride; unsaturated dicarboxylic acids such as maleic acid, itaconic acid and fumaric acid, and salt thereof or esters of the same; vinylsilyl compounds such as vinyltrimethoxysilane; isopropenyl acetate; and the like.

In the polymerization of the vinyl ester monomer, a chain transfer agent may coexist for the purpose of regulating the average degree of polymerization of the PVA, and the like. Examples of the chain transfer agent include: aldehydes such as acetaldehyde, propionaldehyde, butyraldehyde and benzaldehyde; ketones such as acetone, methyl ethyl ketone, hexanone and cyclohexanone; mercaptans such as 2-hydroxyethanethiol; thiocarboxylic acids such as thioacetic acid; halogenated hydrocarbons such as trichloroethylene and perchloroethylene; and the like. Of these, the aldehydes and the ketones are preferred. The amount of the chain transfer agent added may be predetermined depending on the chain transfer constant of the added chain transfer agent, and the average degree of polymerization to be achieved for the PVA, and the like.

As the saponification reaction of the vinyl ester polymer, a well-known alcoholysis or hydrolysis reaction may be adopted in which a basic catalyst such as sodium hydroxide, potassium hydroxide or sodium methoxide, or an acidic catalyst such as p-toluenesulfonic acid is used.

Examples of the solvent which may be used in the saponification reaction include: alcohols such as methanol and ethanol; esters such as methyl acetate and ethyl acetate; ketones such as acetone and methyl ethyl ketone; aromatic hydrocarbons such as benzene and toluene; and the like. These solvents may be used either alone of one type, or in combination of two or more thereof. Of these, carrying out the saponification reaction by using as the solvent methanol or a mixed solution of methanol with methyl acetate, in the presence of sodium hydroxide as the basic catalyst is preferred due to convenience.

Degree of Saponification

The lower limit of the degree of saponification of the PVA is 99.5 mol %, preferably 99.7 mol %, more preferably 99.8%, and particularly preferably 99.9 mol %. The PVA is a crystalline polymer having a crystalline part moiety that results from a hydrogen bond of the hydroxyl group included. The degree of crystallinity of the PVA is increased as the degree of saponification increases. Also, the increased degree of crystallinity leads to a decrease in water solubility of the PVA. In particular, the PVA exhibits significant alteration of the solubility in water at high temperatures with a borderline of the degree of saponification of 99.5 mol %. Thus, the PVA having the degree of saponification of at least 99.5 mol % has superior water resistance (having low solubility) due to the strength of the hydrogen bond, and may have water resistance that is comparable to PVAs having chemical crosslinking. Therefore, when the PVA has the degree of saponification of at least 99.5 mol %, even if the PVA is not subjected to chemical crosslinking, the viscosity elevation and the dehydration at high temperatures of the slurry can be inhibited, and consequently the cost can be lowered as the chemical crosslinking step can be omitted. On the other hand, when the degree of saponification is less than the lower limit, dehydration at high temperature may not be sufficiently inhibited in the case of use as the additive for a slurry. It is to be noted that the degree of saponification of the PVA is a value determined according to JIS-K6726: 1994.

Average Degree of Polymerization

The lower limit of the average degree of polymerization of the PVA is 1,500, preferably 1,700, more preferably 1,800, and still more preferably 2,000. On the other hand, the upper limit of the average degree of polymerization is 4,500, preferably 4,250, more preferably 4,000, and still more preferably 3,800. When the average degree of polymerization of the PVA is less than the lower limit, the dehydration of the slurry at high temperatures may not be sufficiently inhibited which may result from an increase in the solubility to some extent. Whereas, when the average degree of polymerization is greater than the upper limit, the production of the PVA becomes difficult, and the viscosity of the slurry at high temperatures may be excessively increased.

As referred to herein, the average degree of polymerization of the PVA is a value determined according to JIS- K6726: 1994. More specifically, the average degree of polymerization of the PVA can be determined from a limiting viscosity [η] (dL/g) measured in water at 30° C. according to the following formula:

$$\text{average degree of polymerization} = ([\eta] \times 1000/8.29)^{(1/0.62)}.$$

Amount of 1,2-Glycol Linkage

The lower limit of the amount of the 1,2-glycol linkage of the PVA is 0.5 mol %, and more preferably 1.0 mol %. On the other hand, the upper limit of the amount of the 1,2-glycol linkage of the PVA is 1.8 mol %, preferably 1.7 mol %, and more preferably 1.6 mol %. When the amount of the 1,2-glycol linkage of the PVA is thus 1.8 mol % or less, crystallization of the PVA is hardly inhibited by the 1,2-glycol linkage, and therefore the degree of crystallinity of the PVA is likely to be increased, whereby the solubility of the PVA is consequently decreased. Such PVA having a comparably smaller amount of 1,2-glycol linkage is preferably obtained by polymerizing the vinyl ester monomer under a condition of the temperature lower than usual.

As referred to herein, the amount of the 1,2-glycol linkage of the PVA may be determined from the peaks in the NMR spectrum. After being saponified to the degree of saponification of at least 99.9 mol %, the PVA sufficiently washed with methanol and then dried under reduced pressure at 90° C. for 2 days is dissolved in DMSO-D6, to which several drops of trifluoroacetic acid are added. Thus obtained sample is subjected to the measurement at 80° C. by using proton NMR ("GX-500" available from JEOL Ltd.) at 500 MHz. The peaks derived from methine of the vinyl alcohol unit correspond to 3.2 ppm to 4.0 ppm (integrated value: A'), whereas the peak derived from one methine of the 1,2-glycol linkage corresponds to 3.25 ppm (integrated value: B'), and thus the amount of 1,2-glycol linkage can be calculated according to the following formula:

$$\text{Amount of 1,2-glycol linkage (mol \%)} = B'(100-\Delta)/A'$$

wherein, "Δ" denotes the ethylene modification amount (mol %).

The amount of 1,2-glycol linkage of the vinyl alcohol polymer may be adjusted by the copolymerization of a monomer typified by, for example, ethylene carbonate as well as the polymerization temperature and the like.

Proportion of Ethylene Unit

The proportion of the ethylene unit in the PVA is, with respect to the total structural units in the PVA, preferably less than 10 mol %, more preferably less than 9 mol %, and particularly preferably less than 8 mol %. When the proportion of the ethylene unit is 10 mol % or greater, obtaining the PVA having the average degree of polymerization of at least 1,500 may be difficult.

As referred to herein, the proportion of the ethylene unit in the PVA is a value determined from proton NMR of the vinyl ester polymer that is a precursor of the PVA. More specifically, after the vinyl ester polymer as the precursor is sufficiently purified by reprecipitation with n-hexane/acetone at least three times, the vinyl ester polymer for analysis is produced by drying under reduced pressure at 80° C. for 3 days. This vinyl ester polymer is dissolved in DMSO-D6, and subjected to the measurement at 80° C. by using proton NMR ("GX-500" available from JEOL Ltd.) at 500 MHz. The proportion of the ethylene unit is calculated by using the peaks derived from main-chain methine of the vinyl ester (4.7 ppm to 5.2 ppm), and peaks derived from the main-chain methylene of ethylene, the vinyl ester and the third component (0.8 ppm to 1.6 ppm).

Drilling Mud and Production Method Thereof

The drilling mud according to still another embodiment of the present invention plays roles such as, for example: transporting drilled clasts, drilling wastes and the like; improving lubricating properties of bits and drill pipes; filling in holes on the porous ground; balancing out the reservoir pressure that results from the hydrostatic pressure (pressure from the rock stratum); and the like. This drilling mud contains water and a muddy material as principal components, and further contains the aforementioned additive for a slurry as the additive for drilling mud slurry. The drilling mud may also contain optional component(s) within a range not leading to impairment of the effects of the present invention.

Such a drilling mud may be produced by mixing the additive for a slurry, a muddy material, and water. Specifically, the drilling mud can be produced by adding the additive for a slurry, and as needed, optional component(s), to as the base, a water-clay suspension liquid prepared by dispersing and suspending the muddy material in water.

Additive for Drilling Mud Slurry

The additive for a slurry as the additive for drilling mud slurry contains the PVA powder described above. The particle size of the additive for a slurry as the additive for drilling mud slurry is preferably a size that enables passage through a sieve having a nominal mesh opening size of 500 μm (32 mesh). Since the PVA and the PVA powder are as described above, the descriptions in this paragraph are omitted.

However, it is necessary that the PVA powder contained in the drilling mud has a particle size that enables passage through a sieve having a nominal mesh opening size of 1.00 mm (16 mesh), and the size that enables passage through a sieve having a nominal mesh opening size of 500 μm (32 mesh) is more preferred. When the PVA powder contained in the drilling mud thus has the particle size that enables passage through the sieve having a nominal mesh opening size of 500 μm (32 mesh), dehydration from the drilling mud at high temperatures can be more inhibited. It is to be noted that the lower limit of the particle size of the PVA powder is not particularly limited as long as the particle size falls within the range not leading to extremely high solubility, and is typically the size not enabling passage through a sieve having a nominal mesh opening size of 45 μm (325 mesh), and preferably the size not enabling passage through a sieve having a nominal mesh opening size of 53 μm (280 mesh).

The lower limit of the content of the PVA powder in the drilling mud is preferably 0.5 kg/m³, and more preferably 3 kg/m³. On the other hand, the upper limit of the content of the PVA powder in the drilling mud is preferably 40 kg/m³, and more preferably 30 kg/m³.

Muddy Material

Examples of the muddy material include bentonite, attapulgite, sericite, a hydrous silicic acid magnesium salt and the like, and of these, bentonite is preferred.

The lower limit of the amount of the muddy material blended in the drilling mud is preferably 5 g, and more preferably 10 g with respect to 1 kg of the water used in the drilling mud. On the other hand, the upper limit of the amount of the muddy material blended in the drilling mud is preferably 300 g, and more preferably 200 g with respect to 1 kg of the water used in the drilling mud.

Optional Components

As the optional components, well-known additives may be used, and for example, an aqueous solution of a copolymer of an α-olefin having 2 to 12 carbon atoms with maleic anhydride, or a derivative thereof (for example, maleic acid amide, maleic acid imide), an alkali-neutralization product thereof, or the like; a dispersant, a pH-adjusting agent, a defoaming agent, a thickening agent, and the like may be included. The copolymer of an α-olefin having 2 to 12 carbon atoms with maleic anhydride, or a derivative thereof is exemplified by copolymers of an α-olefin such as ethylene, propylene, butene-1, isobutene or diisobutylene with maleic anhydride, or derivatives thereof (for example, Kuraray Co., Ltd., "ISOBAM"). Further, the dispersant is exemplified by a humic acid dispersant, a lignin dispersant and the like, and of these, the lignin dispersant containing a sulfonic acid salt is preferred.

Cement Slurry and Production Method Thereof

The cement slurry according to still other embodiment the present invention is for use in: fixation of the casing pipe into the well; and protection, etc., of the inner wall in the well by, being injected into and hardened in, for example, tubular void portions between the stratum and the casing pipe installed in the well. The cement slurry contains the additive for a slurry as the additive for a cement slurry, as well as a hardening powder and a liquid. The cement slurry may contain optional component(s), within the range not leading to impairment of the effects of the present invention.

The cement slurry is produced by adding the additive for a slurry, and the liquid and the hardening powder, as well as as needed, optional component(s), and mixing using a stirrer or the like.

Additive for Cement Slurry

The additive for a slurry as the additive for a cement slurry contains the PVA powder described above. The particle size of the additive for a slurry as the additive for a cement slurry is preferably the size that enables passage through a sieve having a nominal mesh opening size of 250 μm (60 mesh). Since the PVA and the PVA powder are as described above, the descriptions in this paragraph are omitted.

However, it is necessary that the PVA powder contained in the cement slurry has a particle size that enables passage through a sieve having a nominal mesh opening size of 1.00 mm (16 mesh), and the size that enables passage through a sieve having a nominal mesh opening size of 250 μm (60 mesh) is preferred. When the PVA powder contained in the cement slurry thus has the particle size that enables passage through the sieve having a nominal mesh opening size of 250 μm (60 mesh), dehydration from the cement slurry at high temperatures can be more inhibited. It is to be noted that the lower limit of the particle size of the PVA powder is not particularly limited as long as the particle size falls within the range not leading to extremely high solubility, and the particle size typically does not enable passage through a sieve having a nominal mesh opening size of 45 μm (325 mesh), and preferably the particle size does not enable passage through a sieve having a nominal mesh opening size of 53 μm (280 mesh).

The lower limit of the content of the PVA powder in the cement slurry is preferably 0.1% (BWOC), and more preferably 0.2% (BWOC). On the other hand, the upper limit of the content of the PVA powder in the cement slurry is preferably 2.0% (BWOC), and more preferably 1.0% (BWOC). It is to be noted that "BWOC" means "By Weight Of Cement" which is indicated on mass basis of the cement.

Hardening Powder

The hardening powder is exemplified by Portland cement, mixed cement, eco-cement, special cement and the like. Moreover, the hardening powder is preferably water-hardening cement which is solidified through a reaction with water. It is to be noted that when the cement slurry is used for drilling, geothermal-well cement and oil-well cement are preferred.

The Portland cement is exemplified by those defined according to JIS-R5210: 2009, and specific examples include ordinary Portland cement, high-early-strength Portland cement, ultra high-early-strength Portland cement, moderate heat Portland cement, low-heat Portland cement, sulfate resisting Portland cement, low-alkali Portland cement, and the like.

The mixed cement is exemplified by those defined according to JIS-R5211 to 5213: 2009, and specific examples include blast-furnace slag cement, fly ash cement, silica cement, and the like.

The special cement may include those prepared using the Portland cement as a base, those prepared by changing the component and/or the particle grade constitution of the Portland cement, and those containing components differing from the Portland cement.

The special cement prepared using the Portland cement as a base is exemplified by distensible cement, low heat cement of a two-component system, low heat cement of a three-component system, and the like.

The special cement prepared by changing the component and/or the particle grade constitution of the Portland cement is exemplified by white Portland cement, a cement type hardening material (geocement), ultrafine particle cement, high-belite type cement, and the like.

The special cement containing components differing from the Portland cement is exemplified by rapid hardening cement, alumina cement, phosphate cement, non-hydraulic cement, and the like.

Liquid

The liquid may be selected depending on the type of the hardening powder, and is exemplified by water, a solvent, and a mixture of the same. In general, water is used.

The ratio of the hardening powder to the liquid in the cement slurry may be appropriately predetermined depending on the specific gravity of the intended slurry as well as the strength of the hardened product, etc. For example, when the drilling cement slurry is constituted as a cement slurry for drilling with the water-hardening cement, the ratio (W/C) of water to cement is preferably 25 weight %, and more preferably 30 weight %, from the viewpoints of the specific gravity of the slurry, as well as the strength of the hardened product, and the like. The upper limit of the ratio W/C is preferably 100 weight %, and more preferably 80 weight %, from the viewpoints of the specific gravity of the slurry, as well as the strength of the hardened product, and the like.

Optional Components

As the optional component, a dispersant, a retardant and/or a defoaming agent may be contained in the cement slurry, and additive(s) other than these may be also contained.

Dispersant

The dispersant is exemplified by a naphthalenesulfonic acid-formalin condensate, a melaminesulfonic acid-formalin condensate, an anionic macromolecule such as a polycarboxylic acid polymer and the like, and of these, naphthalenesulfonic acid-formalin condensate is preferred. The lower limit of the content of the dispersant in the cement slurry is typically 0.05% (BWOC), and preferably 0.2% (BWOC). On the other hand, the upper limit of the content of the dispersant in the cement slurry is and 2% (BWOC), and preferably 1% (BWOC).

Retardant

The retardant is exemplified by oxycarboxylic acid and salts thereof, saccharides such as monosaccharides and polysaccharides, and the like, and of these, the saccharides are preferred. The lower limit of the content of the retardant in the cement slurry is typically 0.005% (BWOC), and preferably 0.02% (BWOC). On the other hand, the upper limit of the content of the retardant in the cement slurry is 1% (BWOC), and preferably 0.3% (BWOC).

Defoaming Agent

The defoaming agent is exemplified by an alcohol alkylene oxide adduct, a fatty acid alkylene oxide adduct, polypropylene glycol, a fatty acid soap, a silicone compound and the like, and of these, a silicone compound is preferred. The lower limit of the content of the defoaming agent in the cement slurry is typically 0.0001% (BWOC), and preferably 0.001% (BWOC). On the other hand, the upper limit of the content of the defoaming agent in the cement slurry is 0.1% (BWOC), and preferably 0.05% (BWOC).

Additives

Taking into consideration the intended use, the composition and the like, the cement slurry may contain additives such as, e.g., a cement accelerator, a low-density additive, a high-density additive, a foaming agent, a crack preventive agent, a bubbling agent, an AE agent, a cement-distensible agent, a cement strength stabilizer, a fine aggregate such as a silica powder, a silica fume, a fly ash, a limestone powder and a crushed sand, a coarse aggregate such as a crushed stone, a hollow balloon and the like. Further, these additives may be used alone of one type, or two or more types thereof may be used in combination.

EXAMPLES

Hereinafter, the present invention will be described by way of Examples and Comparative Examples, but the present invention is not in any how limited to the following Examples.

Preparation Example 1: Preparation of Dry PVA (PVA-1)

Into a 250-L reaction vessel equipped with a stirrer, a nitrogen-feeding port, an ethylene-feeding port, an initiator addition port and a delay solution addition port were charged 127.5 kg of vinyl acetate and 22.5 kg of methanol, and the temperature of the mixture was elevated to 60° C. Thereafter, nitrogen was bubbled for 30 min to replace inside the system by nitrogen. Then, ethylene was introduced such that the pressure in the reaction vessel became 4.9 Kg/cm$^2$. As the initiator, a reaction initiator solution was prepared by dissolving 2,2'-azobis(4-methoxy-2,4-dimethylvaleronitrile) (AMV) in methanol to the concentration of 2.8 g/L, and a nitrogen gas was bubbled into this reaction initiator solution to replace inside the system by nitrogen, and this solution was employed as the initiator solution. This initiator solution in a volume of 45 mL was introduced into the reaction vessel regulated to 60° C., whereby the polymerization was initiated. During the polymerization, ethylene was introduced to maintain the pressure in the reaction vessel of 4.9 Kg/cm$^2$, whereas the polymerization temperature was maintained at 60° C., and the initiator solution was continuously added to the reaction vessel at 143 mL/hr to carry out the polymerization. Four hrs later, when the conversion (rate of polymerization) became 40%, the reaction vessel was cooled to stop the polymerization. Furthermore, the reaction vessel was opened to remove ethylene, and nitrogen gas was bubbled so as to completely remove ethylene. Subsequently, the unreacted vinyl acetate monomer was removed under a reduced pressure to give a methanol solution of polyvinyl acetate. To this polyvinyl acetate solution was added methanol to adjust the concentration of polyvinyl acetate to 25% by mass. Furthermore, to 400 g of the methanol solution of polyvinyl acetate (polyvinyl acetate in the solution: 100 g) was added 23.3 g of an alkali solution (10% by mass methanol solution of NaOH; molar ratio of NaOH to the vinyl acetate unit in polyvinyl acetate being 0.1) to carry out saponification. About one min later after adding the alkali solution, the gelated matter was ground by a grinder, and the mixture was left to stand at 40° C. for 1 hr, thereby allowing the saponification to proceed. Thereafter, 1,000 g of methyl acetate was added thereto, and the mixture was left to stand at room temperature for 30 min. To the white solid (PVA) obtained by filtration was added 1,000 g of methanol and the mixture was left to stand for 3 hrs at room temperature to permit washing. Then, PVA obtained by deliquoring through centrifugation was left to stand in a dryer at 100° C. for 3 hrs to give dry PVA (PVA-1).

Characterization of PVA

With respect to the dry PVA (PVA-1), the degree of saponification, the average degree of polymerization, the amount of 1,2-glycol linkage, and the proportion of the ethylene unit were each analyzed according to the following procedure.

Degree of Saponification

The degree of saponification of the dry PVA (PVA-1) was 99.5 mol % as determined according to JIS-K6726: 1994.

Average Degree of Polymerization

After the polymerization in Preparation Example 1, using the methanol solution of polyvinyl acetate obtained through removing the unreacted vinyl acetate monomer, saponification was carried out with the molar ratio of the alkali of 0.5 and then the product was ground, followed by being left to stand at 60° C. for 5 hrs to allow the saponification to proceed. Thereafter, a methanol Soxhlet procedure was performed for 3 days, and then drying under reduced pressure carried out at 80° C. for 3 days gave a purified PVA. This purified PVA has the average degree of polymerization as determined according to JIS-K6726: 1994 of 1,720.

Amount of 1,2-Glycol Linkage

The purified PVA thus prepared in order to determine the average degree of polymerization was dissolved in DMSO-D6, and the amount of 1,2-glycol linkage was determined to be 1.6 mol % as measured at 80° C. using proton NMR ("GX-500" available from JEOL Ltd.) at 500 MHz.

Proportion of Ethylene Unit

After the polymerization in Preparation Example 1, the methanol solution of polyvinyl acetate obtained through removing the unreacted vinyl acetate monomer was subjected to purification by reprecipitation three times including precipitation in n-hexane and dissolving in acetone. Then, drying under reduced pressure at 80° C. for 3 days gave purified polyvinyl acetate. This purified polyvinyl acetate was dissolved in DMSO-D6, and the proportion of ethylene unit (i.e., ethylene content) was determined to be 5 mol % as measured at 80° C. by using proton NMR ("GX-500" available from JEOL Ltd.) at 500 MHz.

Preparation Examples 2 to 17: Preparation of Dry PVAs (PVA-2) to (PVA-17)

In a similar manner to Preparation Example 1, dry PVA (PVA-2) to (PVA-17) having characteristics shown in Table 1 were prepared.

TABLE 1

| | | Characteristics of vinyl alcohol polymer (PVA) | | | |
|---|---|---|---|---|---|
| | | degree of saponification (mol %) | average degree of polymerization | amount of 1,2-glycol linkage (mol %) | ethylene content (mol %) |
| Preparation Example 1 | PVA-1 | 99.5 | 1,720 | 1.6 | 5.0 |
| Preparation Example 2 | PVA-2 | 99.9 | 1,720 | 1.6 | 5.0 |
| Preparation Example 3 | PVA-3 | 99.9 | 1,770 | 1.3 | 5.0 |
| Preparation Example 4 | PVA-4 | 99.7 | 1,600 | 1.6 | 7.0 |
| Preparation Example 5 | PVA-5 | 99.5 | 2,450 | 1.6 | 3.0 |
| Preparation Example 6 | PVA-6 | 99.9 | 2,450 | 1.6 | 3.0 |
| Preparation Example 7 | PVA-7 | 99.9 | 2,430 | 1.6 | 0.0 |
| Preparation Example 8 | PVA-8 | 99.9 | 2,520 | 1.4 | 0.0 |
| Preparation Example 9 | PVA-9 | 99.9 | 3,450 | 1.6 | 0.0 |
| Preparation Example 10 | PVA-10 | 88.2 | 2,430 | 1.6 | 0.0 |
| Preparation Example 11 | PVA-11 | 98.5 | 2,430 | 1.6 | 0.0 |
| Preparation Example 12 | PVA-12 | 98.5 | 1,720 | 1.6 | 5.0 |
| Preparation Example 13 | PVA-13 | 99.3 | 2,430 | 1.6 | 0.0 |
| Preparation Example 14 | PVA-14 | 99.3 | 2,470 | 1.6 | 3.0 |
| Preparation Example 15 | PVA-15 | 99.9 | 1,700 | 2.0 | 2.0 |
| Preparation Example 16 | PVA-16 | 99.9 | 1,260 | 1.6 | 0.0 |
| Preparation Example 17 | PVA-17 | 99.9 | 1,260 | 1.6 | 5.0 |

Example 1: Preparation of Drilling Mud

Into a cup of Hamilton Beach Mixer was weighed 300 g of ion exchanged water, and thereto was added 6 g of bentonite (available from TELNITE CO., LTD., "TELGEL E"). After the mixture was sufficiently stirred, the mixture was left to stand for 24 hrs in order to allow bentonite to be sufficiently swollen. In the meantime, the dry PVA (PVA-1) was subjected to a sieve having a nominal mesh opening size of 1.00 mm (16 mesh), and 1.5 g of the dry PVA (PVA-1) powder passed through the sieve was collected. This powder was added as an additive for a drilling mud to the dispersion liquid of bentonite to give a drilling mud (D-1).

Examples 2 to 9, and Comparative Examples 1 to 8

Drilling muds (D-2) to (D-9) and (d-1) to (d-8) were prepared in a similar manner to Example 1 except that dry PVA (PVA-2) to (PVA-17) powders were each used as shown in Table 2.

Example 10

A drilling mud (D-10) was prepared in a similar manner to Example 6 except that the dry PVA (PVA-6) was subjected to a sieve having a nominal mesh opening size of 500 µm (32 mesh), and the powder of the dry PVA (PVA-6) passed through the sieve was used.

Example 11

A drilling mud (D-11) was prepared in a similar manner to Example 7 except that the dry PVA (PVA-7) was subjected to a sieve having a nominal mesh opening size of 500 µm (32 mesh), and the dry PVA (PVA-7) powder passed through the sieve was used.

Comparative Example 9

After the dry PVA (PVA-1) was mixed with water and the mixture was thoroughly stirred, undissolved PVA powder was removed by using wire mesh having a nominal mesh opening size of 75 µm (200 mesh) to give an aqueous PVA solution having the PVA concentration of 4% by weight. This PVA solution in an amount of 37.5 g was added to a dispersion liquid of bentonite prepared using 264 g of ion exchanged water and 6 g of bentonite in a similar manner to Example 1, whereby a drilling mud (d-9) was prepared.

Comparative Example 10

A drilling mud (d-10) was prepared in a similar manner to Example 1 except that the dry PVA (PVA-1) was subjected to a sieve having a nominal mesh opening size of 1.00 mm (16 mesh), and the dry PVA (PVA-1) powder not having passed through the sieve was used.

Evaluations

The drilling muds (D-1) to (D-11) and (d-1) to (d-10) of Examples 1 to 11 and Comparative Examples 1 to 10 were evaluated with respect to the viscosity and the amount of dehydration each according to the following procedure. In addition, the solubility of sieved powders of dry PVAs (PVA-1) to (PVA-17) used for the preparation of these drilling muds (D-1) to (D-11) and (d-1) to (d-10) was determined according to the following procedure. The results of the evaluations are shown in Table 2.

Solubility

Into a 300-mL beaker previously charged with 100 g of water at 60° C. was charged 4 g of dry PVA powder, and the mixture was stirred under a condition with the rotation frequency of 280 rpm at 60° C. for 3 hrs by using a magnetic stirrer with a bar in the length of 3 cm while preventing evaporation of water. Then, undissolved powder was separated by using a wire mesh having a nominal mesh opening size of 75 µm (200 mesh). The undissolved PVA powder was dried in a heating dryer at 105° C. for 3 hrs, and thereafter the weight was measured. The solubility of the dry PVA powder was determined from the weight of the undissolved PVA powder, and the weight of the dry PVA powder which was charged into the beaker (4 g). However, the solubility was not determined on Comparative Example 9 since PVA-1 was added in the form of an aqueous solution.

Viscosity

The viscosity of the drilling mud was measured by using a B type viscometer at 25° C., 30 rpm, and the value obtained after 10 sec was employed. A smaller value of the viscosity of the drilling mud indicates a more favorable feature, and the evaluation may be made to be: "favorable"

in the vase of being 18 mPa·s or less; and "unfavorable" in the case of exceeding 18 mPa·s.

Amount of Dehydration

The measurement of the amount of dehydration of the drilling mud was carried out by using "HPHT Filter Press Series 387" available from Fann Instrument company, after the drilling mud was charged into the cell in which the temperature had been adjusted to 150° C. and was left to stand for 3 hrs. In the measurement, the pressure was applied from both the above and below the cell such that the differential pressure therebetween was 500 psi. A smaller value of the amount of dehydration of the drilling mud indicates a more favorable feature, and the evaluation may be made to be: "favorable" in the case of being 30 ml or less; and "unfavorable" in the case of exceeding 30 ml.

may result from the use of the dry PVA having the average degree of polymerization of less than 1,500.

Although the dry PVA (PVA-1) was used in the drilling mud (d-9) of Comparative Example 9 similarly to Example 1, the viscosity of the drilling mud (d-9) was very high, and further the amount of dehydration of the drilling mud at 150° C. was greater than 100 mL, indicating markedly insufficient inhibition of the dehydration at a high temperature, which may result from the addition of the dry PVA (PVA-1) after dissolving in water beforehand.

Although the dry PVA (PVA-1) was used in the drilling mud (d-10) of Comparative Example 10 similarly to Example 1, the solubility at 60° C. was somewhat low; however, the amount of dehydration of the drilling mud at 150° C. was 90 mL, indicating markedly insufficient inhi-

TABLE 2

|  | Additive for drilling mud | | | Drilling mud | | |
| --- | --- | --- | --- | --- | --- | --- |
|  | PVA type | particle size* | solubility (%) | drilling mud type | viscosity (mPa · s) | amount of dehydration(mL) |
| Example 1 | PVA-1 | 1.00 mm passed | 17.4 | D-1 | 10 | 23 |
| Example 2 | PVA-2 | 1.00 mm passed | 15.0 | D-2 | 10 | 15 |
| Example 3 | PVA-3 | 1.00 mm passed | 14.2 | D-3 | 10 | 13 |
| Example 4 | PVA-4 | 1.00 mm passed | 15.8 | D-4 | 10 | 14 |
| Example 5 | PVA-5 | 1.00 mm passed | 18.0 | D-5 | 10 | 20 |
| Example 6 | PVA-6 | 1.00 mm passed | 16.2 | D-6 | 10 | 12 |
| Example 7 | PVA-7 | 1.00 mm passed | 18.0 | D-7 | 10 | 25 |
| Example 8 | PVA-8 | 1.00 mm passed | 17.8 | D-8 | 10 | 22 |
| Example 9 | PVA-9 | 1.00 mm passed | 15.4 | D-9 | 10 | 15 |
| Example 10 | PVA-6 | 500 µm passed | 17.3 | D-10 | 12 | 7 |
| Example 11 | PVA-7 | 500 µm passed | 20.1 | D-11 | 14 | 20 |
| Comparative Example 1 | PVA-10 | 1.00 mm passed | 100 | d-1 | 350 | >100 |
| Comparative Example 2 | PVA-11 | 1.00 mm passed | 55.0 | d-2 | 21 | >100 |
| Comparative Example 3 | PVA-12 | 1.00 mm passed | 58.0 | d-3 | 19 | >100 |
| Comparative Example 4 | PVA-13 | 1.00 mm passed | 34.8 | d-4 | 14 | 42 |
| Comparative Example 5 | PVA-14 | 1.00 mm passed | 31.0 | d-5 | 12 | 38 |
| Comparative Example 6 | PVA-15 | 1.00 mm passed | 26.9 | d-6 | 11 | 32 |
| Comparative Example 7 | PVA-16 | 1.00 mm passed | 30.2 | d-7 | 11 | 50 |
| Comparative Example 8 | PVA-17 | 1.00 mm passed | 29.5 | d-8 | 11 | 46 |
| Comparative Example 9 | PVA-1 | added as an aqueous solution | | d-9 | 1200 | >100 |
| Comparative Example 10 | PVA-1 | 1.00 mm not passed | 16.8 | d-10 | 10 | 90 |

*The dimension is the nominal mesh opening size defined in "JIS Z8801:2000".

As is clear from the results shown in Table 2, the drilling muds (D-1) to (D-11) of Examples 1 to 11 had a low viscosity, and the amount of dehydration at 150° C. was 25 mL or less. Thus, dehydration at a high temperature was significantly inhibited to a very low level.

On the other hand, any of the solubility of the drilling muds (d-1) to (d-5) of Comparative Examples 1 to 5 was greater than 25%, and consequently the amount of dehydration of the drilling mud at 150° C. exceeded 30 mL, indicating the failure of sufficient inhibition of the dehydration at a high temperature, which may result from the use of the dry PVA having the degree of saponification of less than 99.5 mol % in the drilling muds (d-1) to (d-5).

The solubility of the drilling mud (d-6) of Comparative Example 6 was greater than 25%, and consequently the amount of dehydration of the drilling mud at 150° C. was 32 mL, indicating the failure of sufficient inhibition of the dehydration at a high temperature, which may result from the use of the dry PVA having the amount of 1,2-glycol linkage of greater than 1.8 mol %.

The solubility of the drilling muds (d-7) and (d-8) of Comparative Examples 7 and 8 was greater than 25%, and further the amount of dehydration of the drilling mud at 150° C. was at least 35 mL, indicating the failure of sufficient inhibition of the dehydration at a high temperature, which bition of the dehydration at a high temperature, which may result from the great particle size when added to the drilling mud (d-10) that does not enable the passage through the nominal mesh opening size of 100 mm (16 mesh).

From the results described above, when used in preparation of the drilling mud, the powdery vinyl alcohol polymer having: the solubility of 25% or less when immersed in hot water at 60° C. for 3 hrs; the degree of saponification of at least 99.5 mol %; the average degree of polymerization of at least 1,500 and 4,500 or less; and the amount of the 1,2-glycol linkage of 1.8 mol % or less, and is capable of passing through a sieve having a nominal mesh opening size of 100 mm (16 mesh), was able to lower the viscosity of the drilling mud and to inhibit the dehydration at a high temperature, verifying that the powdery vinyl alcohol polymer was very useful as the additive for a drilling mud.

Example 12

Preparation of Cement Slurry

A cement slurry (S-1) was prepared by charging into a juice mixer, 4 g of the dry PVA (PVA-6) powder as an additive for a cement slurry, passed through a sieve having a nominal mesh opening size of 250 µm (60 mesh) obtained by subjecting the dry PVA (PVA-6) to sieving, 320 g of ion exchanged water, 800 g of class H cement for wells, 4 g of naphthalenesulfonic acid-formalin condensate sodium salt (Dipersity Technologies Inc., "Daxad-19") and 0.16 g of lignosulfonic acid sodium salt (Lignotech USA, Inc., "Kelig 32L"), and then mixing with stirring. It is to be noted that the amount of the dry PVA (PVA-6) powder added was 0.5% on mass basis of the cement (BWOC).

Example 13

A cement slurry (S-2) was prepared in a similar manner to Example 12 except that the dry PVA (PVA-9) was used.

Comparative Example 11

A cement slurry (s-1) was prepared in a similar manner to Example 12 except that the dry PVA (PVA-10) was used.

Comparative Example 12

A cement slurry (s-2) was prepared in a similar manner to Comparative Example 11 except that the amount of the dry PVA (PVA-10) added was changed to 0.8% (BWOC).

Comparative Example 13

A cement slurry (s-3) was prepared in a similar manner to Example 12 except that the dry PVA (PVA-13) was subjected to a sieve having a nominal mesh opening size of 180 μm (80 mesh), and the dry PVA (PVA-13) powder passed through the sieve was used.
Evaluations The cement slurries (S-1), (S-2) and (s-1) to (s-3) of Examples 12 and 13, and Comparative Examples 11 to 13 were evaluated with respect to the viscous characteristic and the amount of dehydration each according to the following procedure. The results of the evaluations are shown in Table 3. In addition, the solubility of powders of the dry PVAs (PVA-6), (PVA-9), (PVA-10) and (PVA-13) used for the preparation of these cement slurries (S-1), (S-2) and (s-1) to (s-3) obtained after the sieving is shown in Table 3.

Viscosity

The viscosities of the cement slurries were evaluated in terms of plastic viscous characteristic (PV) and yield value (YV). The plastic viscous characteristic (PV) is a value of flow resistance generated by mechanical friction of solid contents included in the cement slurry. The yield value (YV) is a shearing force required for continuing flowing when a fluid is in a flowing state, and is a flow resistance generated by a tractive force among solid particles included in the cement slurry.

The plastic viscosity (PV) and the yield value (YV) were measured according to the method described in "Appendix H" of "API10" (American Institute Specification 10), after adjusting the temperature of the cement slurry to 25° C. or 90° C. A smaller value of the plastic viscosity (PV) of the cement slurry indicates a more favorable feature, and may be evaluated to be: "favorable" in the case of being 60 cp or less; and "unfavorable" in the case of exceeding 60 cp under the condition of 20° C. Further, the yield value (YV) of the cement slurry may be evaluated to be: "favorable" in the case of being 7 lb/100 ft$^2$ or less; and "unfavorable" in the case of exceeding 7 lb/100 ft$^2$ under the condition of 20° C. It is to be noted that the plastic viscous characteristic (PV) and the yield value (YV) were each calculated in accordance with the following formula:

plastic viscous characteristic (PV)=[(reading at 300 rpm)−(reading at 100 rpm)]×1.5;

yield value (YV)=[(reading at 300 rpm)−(plastic viscous characteristic)].

Amount of Dehydration

The amount of dehydration of the cement slurry was measured according to the method described in "Appendix H" of "API10" (American Institute Specification 10), in terms of the amount dehydrated from the cement slurry having the temperature adjusted to 90° C. for 30 min, under a condition of the differential pressure of 1,000 psi. A smaller value of the amount of dehydration of the cement slurry indicates a more favorable feature, and the evaluation may be made to be: "favorable" in the case of being 35 ml or less; and "unfavorable" in the case of exceeding 35 ml.

TABLE 3

| | Additive for cement slurry | | | Cement slurry | | | | |
| | | | | cement | amount of | viscous characteristic | | amount of |
| | PVA type | particle size*[1] | solubility (%) | slurry type | added PVA (% by mass)*[2] | PV (cp) | YV (lb/100 ft$^2$) | dehydration (mL) |
|---|---|---|---|---|---|---|---|---|
| Example 12 | PVA-6 | 250 μm passed | 17.8 | S-1 | 0.5 | 32 (20° C.) 48 (90° C.) | 2 (20° C.) 9 (90° C.) | 25 |
| Example 13 | PVA-9 | 250 μm passed | 15.8 | S-2 | 0.5 | 35 (20° C.) 54 (90° C.) | 3 (20° C.) 10 (20° C.) | 32 |
| Comparative Example 11 | PVA-10 | 250 μm passed | 100 | s-1 | 0.5 | 86 (20° C.) 36 (90° C.) | 11 (20° C.) 8 (90° C.) | 313 |
| Comparative Example 12 | PVA-10 | 250 μm passed | 100 | s-2 | 0.8 | 132 (20° C.) 58 (90° C.) | 28 (20° C.) 5 (90° C.) | 36 |
| Comparative Example 13 | PVA-13 | 180 μm passed | 35.2 | s-3 | 0.5 | 35 (20° C.) 42 (90° C.) | 1 (20° C.) 10 (90° C.) | 340 |

*[1]The dimension is the nominal mesh opening size defined in "JIS-Z8801:2000".
*[2]By Weight Of Cement (BWOC)

As is clear from the results shown in Table 3, the cement slurries (S-1) and (S-2) of Examples 12 and 13 had a low viscosity, and the amounts of dehydration at 90° C. were 25 mL and 32 mL, respectively, indicating inhibited dehydration at a high temperature.

On the other hand, the solubility of the cement slurry (s-1) of Comparative Example 11 was greater than was greater than 25%, and consequently the amount of dehydration of the cement slurry at 90° C. was 313 mL, indicating the failure of sufficient inhibition of the dehydration at high temperatures in the amount of addition which is identical to that of the cement slurries of Examples 12 and 13, which may result from the use of the dry PVA (PVA-10) which was partially saponified to the degree of saponification of 88.2 mol %.

Although the dry PVA (PVA-10) partially saponified identical to the cement slurry of Comparative Example 11 was used in the cement slurry (s-2) of Comparative Example 12, the amount of dehydration of the cement slurry at 90° C. was significantly improved to be 36 mL, which may result from the high amount of addition of 0.8 (% BWOC). However, PV at 20° C. was as high as 132 cp revealing the results not suited for practical applications, which may result from the high amount of addition of the dry PVA (PVA-10).

The amount of dehydration of the cement slurry at 90° C. of the cement slurry (s-3) of Comparative Example 13 was 340 mL, which may result from the use of the dry PVA (PVA-13) having the degree of saponification of 99.3 mol %, indicating the failure of sufficient inhibition of the dehydration at high temperatures.

From the results described above, when used in preparation of the drilling mud and the cement slurry, the powdery vinyl alcohol polymer having: the solubility of 25% or less when immersed in hot water at 60° C. for 3 hrs; the degree of saponification of at least 99.5 mol %; the average degree of polymerization of at least 1,500 and 4,500 or less; and the amount of 1,2-glycol linkage of 1.8 mol % or less, and is capable of passing through a sieve of 250 μm (60 mesh), exhibited inhibition of the dehydration and viscosity elevation at a high temperature even if used in a smaller amount, verifying that the powdery vinyl alcohol polymer was very useful as the additive for a drilling mud and a cement slurry.

INDUSTRIAL APPLICABILITY

According to the present invention, an additive for a slurry, a drilling mud and a drilling cement slurry are provided which are capable of inhibiting viscosity elevation and dehydration at high temperatures at low cost, through use for a slurry for civil engineering and construction (for example, a drilling mud and a drilling cement slurry for use in well drilling. etc.), and the like.

The invention claimed is:

1. A powdery additive comprising a vinyl alcohol polymer, wherein the vinyl alcohol polymer has:
    a solubility of 25% or less when immersed in hot water at 60° C. for 3 hours; a degree of saponification of at least 99.5 mol %; an average degree of polymerization of 1,500 to 4,500; and an amount of 1,2-glycol linkage of 1.8 mol % or less, and the powdery additive is capable of passing through a sieve having a nominal mesh opening size of 1.00 mm,
    wherein the solubility is represented by the following formula:

solubility=(4 g weight of vinyl alcohol polymer powder charged into 100 g of the hot water−weight of undissolved vinyl alcohol polymer powder separated by using a wire mesh having a nominal mesh opening size of 75 micron measured after drying with a heating dryer at 105° C. for 3 hours)/(4 g weight of vinyl alcohol polymer powder charged into 100 g of the hot water), wherein a proportion of an ethylene unit with respect to total structural units in the vinyl alcohol polymer is less than 10 mol %.

2. The powdery additive according to claim 1, which is suitable as an additive for a slurry for civil engineering and construction.

3. The powdery additive according to claim 2, is suitable as an additive for a drilling mud.

4. The powdery additive according to claim 1, which is capable of passing through a sieve having a nominal mesh opening size of 500 um.

5. The powdery additive according to claim 2, is suitable as an additive for a cement slurry.

6. The powdery additive according to claim 1, which is capable of passing through a sieve having a nominal mesh opening size of 250 um.

7. A drilling mud comprising the powdery additive according to claim 1.

8. A method of producing a drilling mud, comprising mixing: the powdery additive according to claim 1; water; and a muddy material.

9. A cement slurry comprising the powdery additive according to claim 1.

10. A method of producing a cement slurry, comprising mixing: the powdery additive according to claim 1; a liquid; and a hardening powder.

* * * * *